Dec. 22, 1942.  A. W. MUTH  2,305,983
HAND BRAKE SIGNAL SWITCH
Filed Aug. 27, 1940
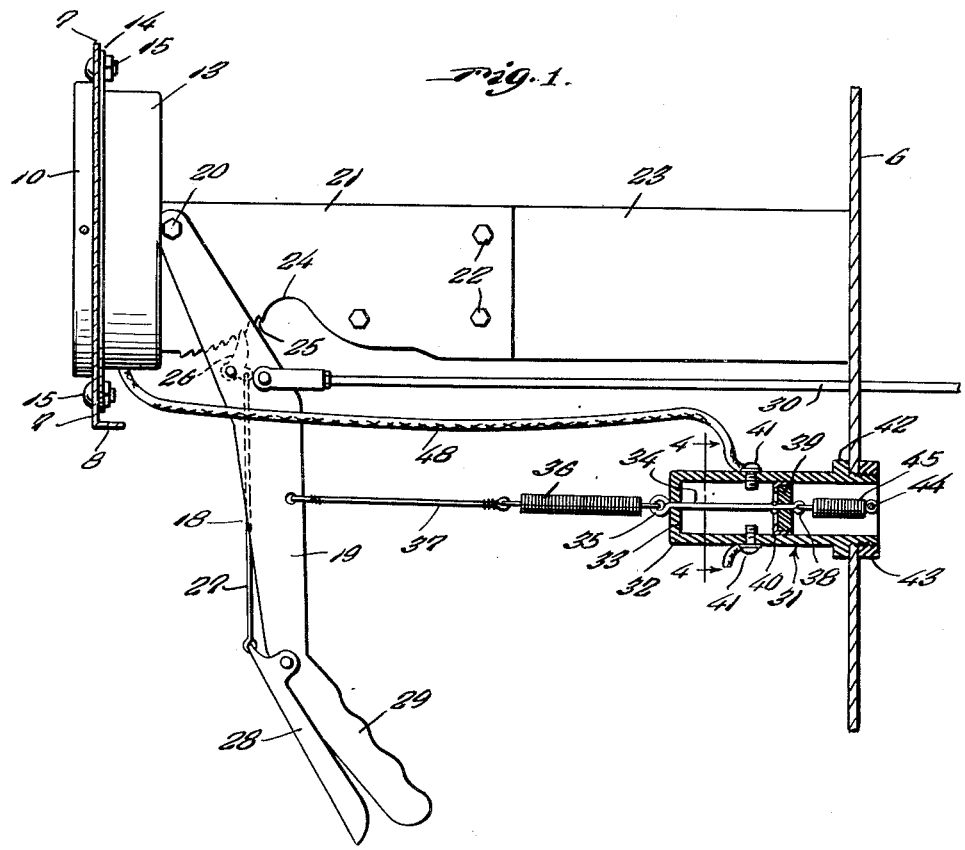
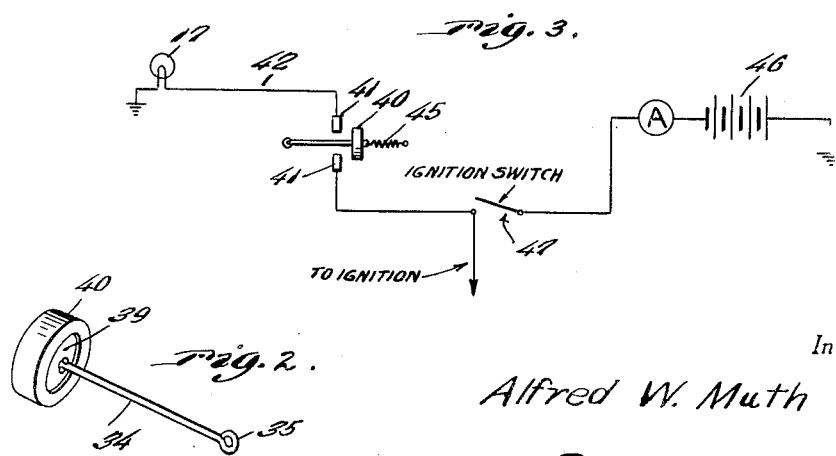
Inventor
Alfred W. Muth
By Clarence A. O'Brien
Attorney Patented Dec. 22, 1942

2,305,983

UNITED STATES PATENT OFFICE 2,305,983

HAND BRAKE SIGNAL SWITCH

Alfred W. Muth, Milwaukee, Wis.

Application August 27, 1940, Serial No. 354,423

1 Claim. (Cl. 200—59)

This invention appertains to new and useful improvements in hand brake signal switches and more particularly to a signal or indicator for indicating when the emergency brake is applied at the same time the ignition switch is in "on" position, thus warning the driver against possibly driving his automobile with the emergency brake applied.

The principal object of the present invention is to provide an indicator of the character stated which is entirely automatic in operation.

Another important object of the invention is to provide an indicator of the character stated which will give a definite clearly observable warning to the driver.

These and other objects and advantages of the invention will become apparent to the reader of the following specification.

In the drawing:

Figure 1 represents a vertical sectional view with parts shown in elevation of an ordinary automobile instrument board with the indicator mounted thereon.

Figure 2 is a perspective view of the contactor.

Figure 3 is a diagrammatic view disclosing the electrical connection between the electrical devices involved.

Referring to the drawing wherein like numerals designate like parts, it can be seen that numeral 6 represents the usual automobile body cowl wall, while numeral 7 denotes the usual instrument board.

The lower edge of the instrument board 7 is flanged in the usual manner as at 8 and to accommodate the indicator generally referred to by numeral 9, the instrument board 7 is stamped out to accommodate a lamp box 13.

The peripheral portion of the box 13 has ears 14 apertured to accommodate bolts 15 which also pass through the instrument board 7 for thus positively securing the indicator in place on the instrument board.

A lamp 17 is suitably mounted in the lamp box 13.

The brake control generally referred to by numeral 18 may be of the type such as is mounted behind the instrument board 7, the same consisting of a lever 19 pivotally secured at its upper end as at 20 to the rear end of a plate 21 which is secured by suitable means to the rear side of the instrument board 7 and also by suitable means 22 to the strut 23 which extends to the cowl wall 9.

The lower edge portion of the plate 21 is cut out to define a curved portion with the pivot point 20 as its center and this curved portion which is denoted by numeral 24 is formed to provide ratchet teeth 25. A rockable pawl 26 mounted on the lever 19 is ridable against the teeth 25 and is controlled by a connecting rod 27 which extends from the pawl 26 to one end of the pivotal hand grip 28 on the handle 29 of the lever 19. A connecting rod 30 extends to connect through associated means with the vehicle brakes.

A switch for controlling the indicator 9 is generally referred to by numeral 31 and consists of the elongated barrel 32 of insulation having a closed end 33 through which the rod 34 is slidable. One end of this rod 34 has an eye 35 which is connected by a tension spring 36 to a rod 37 which, in turn, is connected to an intermediate portion of the lever 19.

The other end of the rod 34 has an eye 38 which abuts one side of the body or slide 39, this slide having a rim 40 of current conductive material adapted to bridge the contact members 41—41.

The other end portion of the barrel 32 has a circumferential external flange 42 which abuts the rear side of the cowl wall 6. This end of the barrel is also externally threaded to accommodate a nut 43 which can be tightened against the forward side of the wall 6 to firmly hold the barrel 32 in a substantially horizontal position. This end of the barrel 32 also has a cross member 44 between which and the eye 38 is a tension spring 45.

Thus it can be seen, that when the lever 19 is swung forwardly to brake-applied position, the slide 39 will be pulled toward the contacts 41—41 and bridge the contacts 41—41, so that current will pass from a battery 46, provided the ignition switch 47 is "on" and from there through the contacts 41—41 and rim 40 by way of the conductor 48 to the lamp 17. Thus the indicator 9 will be energized as long as the ignition switch 47 is on and the emergency brake is applied. However, when the driver observes the warning indicator 9, upon releasement of the brake lever 19, the spring 45 will pull the slide 39 back to a position spaced from the contacts 41—41, thus deenergizing the indicator 9.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A switch structure comprising a wall having an opening therein, a shell of insulation having a stop formation adjacent one end thereof adapted to bear against one side of the wall, said one end of the shell being open, said shell from the stop formation to said open end being threaded and adapted to be disposed through the opening in the wall and a nut on the open end portion of the shell adapted to be fed against the remaining side of the wall, a piston contactor movable in the shell and having a rim of conductive material, a pair of radial contacts extending through said shell and adapted to be bridged by the rim, an elongated member extending through the other end of the shell slidably and through the contactor, a cross member in the open end of the shell, an eye on the contactor end of the member and a tension spring between the cross member and the eye.

ALFRED W. MUTH.